United States Patent [19]
Imashiro et al.

[11] Patent Number: 5,889,096
[45] Date of Patent: Mar. 30, 1999

[54] HYDROLYSIS STABILIZER FOR ESTER GROUP-CONTAINING RESIN AND PROCESS FOR HYDROLYSIS STABILIZATION OF ESTER GROUP-CONTAINING RESIN USING SAID HYDROLYSIS STABILIZER

[75] Inventors: Yasuo Imashiro; Ikuo Takahashi; Naofumi Horie; Takeshi Yamane, all of Tokyo, Japan

[73] Assignee: Nisshinbo Industries, inc., Tokyo, Japan

[21] Appl. No.: 826,967

[22] Filed: Apr. 9, 1997

[30] Foreign Application Priority Data

Apr. 26, 1996 [JP] Japan .................................. 8-131383

[51] Int. Cl.⁶ .............................. C08K 5/29; C07C 249/00

[52] U.S. Cl. .............................................. 524/195; 564/252

[58] Field of Search ........................... 252/390; 524/195; 564/252

[56] References Cited

U.S. PATENT DOCUMENTS

| | | | |
|---|---|---|---|
| 4,419,294 | 12/1983 | Feldman et al. | 560/334 |
| 4,487,964 | 12/1984 | Watson, Jr. et al. | 564/252 |
| 4,820,863 | 4/1989 | Taylor | 560/115 |
| 5,360,933 | 11/1994 | Imashiro et al. | 564/252 |
| 5,621,031 | 4/1997 | Leimann et al. | 524/195 |

*Primary Examiner*—Kriellion S. Morgan
*Attorney, Agent, or Firm*—Kubovcik & Kubovcik

[57] ABSTRACT

A hydrolysis stabilizer for an ester group-containing resin, which comprises as a main component a carbodiimide having at least two carbodiimide groups in the molecule and resulting from 4,4'-dicyclohexylmethane diisocyanate, isophorone diisocyanate or a mixture of 4,4'-dicyclohexylmethane diisocyanate and isophorone diisocyanate, or from a mixture of tetramethylxylylene diisocyanate with 4,4'-dicyclohexylmethane diisocyanate, isophorone diisocyanate or a mixture of 4,4'-dicyclohexylmethane diisocyanate and isophorone diisocyanate; and a process for the hydrolysis stabilization of an ester group-containing resin, which comprises mixing a polyester type resin with the above hydrolysis stabilizer.

6 Claims, No Drawings

HYDROLYSIS STABILIZER FOR ESTER GROUP-CONTAINING RESIN AND PROCESS FOR HYDROLYSIS STABILIZATION OF ESTER GROUP-CONTAINING RESIN USING SAID HYDROLYSIS STABILIZER

BACKGROUND OF THE INVENTION

1. Field of the Invention

The present invention relates to a hydrolysis stabilizer for an ester group-containing resin and a process for the hydrolysis stabilization of an ester group-containing resin using said hydrolysis stabilizer. More particularly, it relates to a hydrolysis stabilizer for an ester group-containing resin which stabilizer does not generate a bad odor when kneaded with the resin at a high temperature, has an excellent compatibility and reactivity with a resin to which the stabilizer is added, even at a low temperature and exhibits thereby an excellent hydrolysis stabilizing effect and comprises a carbodiimide as a main component, and to a process for the hydrolysis stabilization of an ester group-containing resin using the above hydrolysis stabilizer.

2. Description of Related Art

Ester group-containing resins (referred to hereinafter as ester type resins in some cases), for example, polyester polyurethane (PU), polyethylene terephthalate (PET), polybutylene terephthalate (PBT) and the like have excellent elasticity and moldability, and hence, have been employed in various uses.

However, for example, the above-mentioned polyester polyurethane resin is usually obtained by urethanizing a diisocyanate such as 4,4'-diphenylmethane diisocyanate (MDI), tolylene diisocyanate (TDI) or the like with a difunctional polyester polyol, so that it has many ester groups in the molecule. Accordingly, it is known that there are such problems that not only is this ester group easily hydrolyzed with moisture to cause reduction of molecular weight, but also the acidic carboxyl group formed by this hydrolysis accelerates the hydrolysis of the ester linkage, so that the strength is reduced and the reduction of strength makes it impossible for the resin per se to resist the strain caused during the curing of the resin, whereby cracking and further reduction of strength are caused.

In order to prevent such deterioration of physical properties, it has been tried to add various additives during the molding of a polyester polyurethane resin to trap the carboxyl groups and alcohol groups formed by the hydrolysis, thereby preventing hydrolysis from further proceeding.

The above additives include, for example, oxazolines, epoxy compounds, aromatic polycarbodiimides, aliphatic monocarbodiimides and the like. These additives are usually in the form of powder and used in such a manner that they are dry blended with resin pellets or mixed in a given amount with the resin by use of a measuring hopper during molding or spinning, and then, the resulting mixture is melt-kneaded at a given temperature (250°–300° C. in the case of polyethylene terephthalate).

However, the above-mentioned epoxy compounds and oxazolines have no sufficient effect of improving the hydrolysis resistance, increase the melt viscosity of the resin and deteriorate the moldability, so that they have no practical usability. Moreover, the above aromatic carbodiimides are usually thermosetting, and hence, their carbodiimide groups cross-link upon heating and when they are kneaded with the resin, the viscosity of the resulting mixture increases or they become lump-like and are ununiformly dispersed in the resin, and hence, in some cases, no desirable effect of hydrolysis stabilization can be obtained.

For the purpose of preventing the above-mentioned problems of aromatic carbodiimides when heated, there have been developed various aromatic carbodiimides having a group of high steric hindrance in the ortho-position to the carbodiimide group. However, these aromatic carbodiimides are pyrolyzed by a heat applied when they are melt-kneaded with a polyester polyurethane resin, and in addition, generate remarkably unpleasant odor due to the vaporization of impurities or starting materials, resulting in a deterioration of working atmosphere. Furthermore, the gas generated contains aromatic amines and the like and hence is very dangerous in view of not only bad odor but also toxicity, and hence, there is such a problem that a large scale deodorizing or ventilating apparatus becomes necessary.

Moreover, as aliphatic carbodiimides, the use of dicyclohexylcarbodiimide is well known; however, this dicyclohexylcarbodiimide reacts easily with water to be converted to dicyclohexylurea, and hence, has a problem in that close attention must be paid for preventing moisture in the storage of dicyclohexylcarbodiimide. Therefore, it is inadequate to use in industry. Furthermore, a monocarbodiimide is a low molecular weight compound and when added to a polyester polyurethane resin, it bleeds out of the resin, so that it has such a problem that the hydrolysis resistance is not sufficient.

SUMMARY OF THE INVENTION

It is an object of the present invention to overcome the above disadvantages of the prior art and provide a hydrolysis stabilizer for an ester group-containing resin such as polyester polyurethane resin or the like which stabilizer has an excellent compatibility with said resin, can be easily added without any trouble to said resin during the synthesis and melt-kneading of said resin, has a high molecular weight and, therefore, can sufficiently exhibit the effect of hydrolysis stabilization of the said resin.

It is another object of the present invention to provide a process for the hydrolysis stabilizer of an ester group-containing resin using the above hydrolysis stabilizer.

According to the present invention, there is provided a hydrolysis stabilizer for an ester group-containing resin, which comprises as a main component a carbodiimide having at least two carbodiimide groups in the molecule and resulting from 4,4'-dicyclohexylmethane diisocyanate represented by the formula (I):

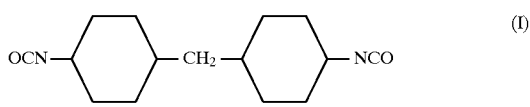

or isophorone diisocyanate represented by the formula (II):

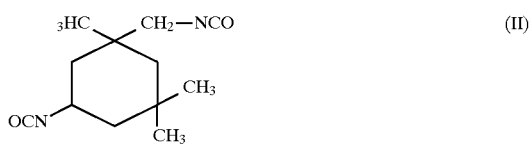

or a mixture of 4,4'-dicyclohexylmethane diisocyanate of the formula (I) with isophorone diisocyanate of the formula (II), or, a carbodiimide having at least two carbodiimide groups in the molecule and resulting from a mixture of tetramethylxylylene diisocyanate represented by the formula (III):

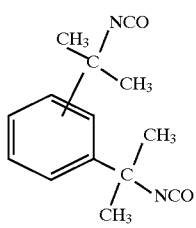

with 4,4'-dicyclohexylmethane diisocyanate represented by the formula (I), isophorone diisocyanate represented by the formula (II) or a mixture of 4,4'-dicyclohexylmethane diisocyanate of the formula (I) and isophorone diisocyanate of the formula (II).

According to the present invention, there is further provided a process for the hydrolysis stabilization of an ester group-containing resin which comprises mixing a polyester resin with a carbodiimide having at least two carbodiimide groups in the molecule and resulting from 4,4'-dicyclohexylmethane diisocyanate represented by the formula (I):

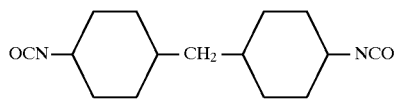

or isophorone diisocyanate represented by the formula (II):

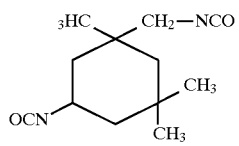

or a mixture of 4,4'-dicyclohexylmethane diisocyanate of the formula (I) with isophorone diisocyanate of the formula (II), or, a carbodiimide having at least two carbodiimide groups in the molecule and resulting from a mixture of tetramethylxylylene diisocyanate represented by the formula (III):

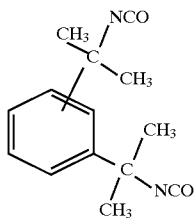

with 4,4'-dicyclohexylmethane diisocyanate represented by the formula (I), isophorone diisocyanate represented by the formula (II) or a mixture of 4,4'-dicyclohexylmethane diisocyanate of the formula (I) and isophorone diisocyanate of the formula (II).

DETAILED DESCRIPTION OF THE INVENTION

The present hydrolysis stabilizer for an ester group-containing resin comprises as a main component:

(1) a carbodiimide having at least two carbodiimide groups in the molecule and resulting from 4,4'-dicyclohexylmethane diisocyanate represented by the above formula (I) (referred to hereinafter as HMDI in some cases), or, isophorone diisocyanate represented by the above formula (II) (referred to hereinafter as IPDI in some cases), or, a mixture of HMDI and IPDI, or (2) a carbodiimide having at least two carbodiimide groups in the molecule and resulting from a mixture of tetramethylxylylene diisocyanate represented by the above formula (III) (referred to hereinafter as TMXDI in some cases) with HMDI, IPDI or a mixture of HMDI and IPDI. Said carbodiimide can be produced by subjecting (1) HMDI, IPDI or a mixture of HMDI and IPDI, or (2) a mixture of TMXDI with HMDI, IPDI or a mixture of HMDI and IPDI, as the starting materials to carbodiimidization reaction accompanied by decarboxylation reaction.

The above carbodiimidization reaction is effected in the presence of a suitable carbodiimidization catalyst, and as the carbodiimidization catalyst which can be used, organic phosphorus compounds are preferable, and phosphorene oxides are particularly preferable in view of activity. Specifically, there are mentioned 3-methyl-1-phenyl-2-phosphorene-1-oxide, 3-methyl-1-ethyl-2-phosphorene-1-oxide, 1,3-dimethyl-2-phosphorene -1-oxide, 1-phenyl-2-phosphorene-1-oxide, 1-ethyl-2-phosphorene-1-oxide, 1-methyl-2-phosphorene-1-oxide and double bond isomers thereof. Among them, 3-methyl-1-phenyl-2-phosphorene-1-oxide, which is easily commercially available, is particularly preferable.

The above carbodiimidization reaction can be carried out by a known method, for example, by adding the above-mentioned catalyst to (1) HMDI, IPDI or a mixture of HMDI and IPDI, or (2) a mixture of TMXDI with HMDI, IPDI or a mixture of HMDI and IPDI in the absence of a solvent or to a solution of (1) or (2) in a solvent inert thereto, in a proportion of 0.1 to 10% by weight (a larger amount is possible when the economy is neglected), preferably 0.5 to 5% by weight, based on the total weight of the isocyanates in the atmosphere of an inert gas such as nitrogen or the like or with bubbling of the inert gas, and then heating the resulting mixture with stirring at a reaction temperature within the range of from 150° C. to 200° C., thereby allowing a carbodiimidization reaction accompanied by decarboxylation reaction to proceed.

The reaction time for the above reaction is varied depending upon the reaction temperature, the kind and amount of the catalyst and the like, and when, for example, HMDI is used as the starting material and 3-methyl-1-phenyl-2-phosphorene-1-oxide is added in a proportion of 1% by weight based on the total weight of the isocyanates and the reaction is effected at a reaction temperature of 180° C., it is possible to obtain in about 20 hours a carbodiimide compound resulting from HMDI, and even when IPDI is used as the starting material the same applies.

When, for example, a mixture of TMXDI and HMDI is used as the starting material, it is possible to obtain a carbodiimide compound resulting from the mixture of TMXDI and HMDI similarly to the above.

Incidentally, the proceeding of the reaction may be confirmed by observing the absorption of isocyanate group at 2258 cm$^{-1}$ in an infrared absorption spectrum or confirmed by a titration method.

In the above reaction, when (1) HMDI, IPDI or a mixture of HMDI and IPDI, or (2) a mixture of TMXDI with HMDI, IPDI or a mixture of HMDI and IPDI is used, a carbodiimide represented by the following formula (IV) can be obtained:

$$OCN—(R_1—NCN)_n—R_2—NCO \qquad (IV)$$

wherein $R_1$ and $R_2$ may be the same as or different from each other and each represents the residue of TMXDI, HMDI or IPDI freed from NCO group; and the polymerization style of the above isocyanates may be a random polymerization or a block polymerization; and n is an integer of 2 or more.

As the carbodiimide which is the main component of the present hydrolysis stabilizer for an ester group-containing resin, there may be a product obtained by end-blocking a carbodiimide having terminal isocyanate groups obtained by the above-mentioned method, with an amine, a carboxylic acid, an acid anhydride, a monoisocyanate or the like.

When the terminal isocyanate of the carbodiimide is blocked with a monoisocyanate, a carbodiimide represented by the following formula (V) can be obtained:

$$R_3-NCN-(R_5-NCN)_m-R_4 \quad (V)$$

wherein $R_3$ and $R_4$ may be the same as or different from each other and each represents the residue of the monoisocyanate freed from NCO group; m is an integer of 1 or more; and $R_5$ represents the residue of the diisocyanate used in the reaction similarly to $R_1$ and $R_2$.

Incidentally, the proportion (mole ratio) of the diisocyanate [(1) HMDI, IPDI or a mixture of HMDI and IPDI or (2) a mixture of TMXDI with HMDI, IPDI or a mixture of HMDI and IPDI] to the monoisocyanate is 1:2–302:, preferably 4:2–19:2, and when the diisocyanate and the monoisocyanate are used in a proportion of 3:2, the number of carbodiimide units in one molecule, namely n, becomes 4 and when the proportion is 19:2, n becomes 20.

When the terminals of the carbodiimide are blocked with the monoisocyanate, it is favorable, for obtaining a carbodiimide having the desired molecular weight, that the diisocyanate and the monoisocyanate are previously mixed to effect carbodiimidization, because it is possible to control the amount of the monocarbodiimide produced by condensation of the monoisocyanate molecules with each other.

The monoisocyanate used for blocking the terminals of the carbodiimide includes n-butyl isocyanate, tert-butyl isocyanate, isobutyl isocyanate, ethyl isocyanate, n-propyl isocyanate, cyclohexyl isocyanate, n-octyl isocyanate and the like, and these may be used alone or in admixture of two or more.

Moreover, when the terminals of a carbodiimide are blocked with a monofunctional compound having a group capable of reacting with the isocyanate group, for example, an amine, a carboxylic acid or an acid anhydride, a carbodiimide represented by the formula (VI) can be obtained:

$$R_6-X-(R_1-NCN)_p-R_2-X-R_7 \quad (VI)$$

wherein $R_6$ and $R_7$ may be the same as or different from each other and each represents the residue of the monofunctional compound having a group capable of reacting with an isocyanate group, for example, an amine, a carboxylic acid or an acid anhydride, formed by reaction with the isocyanate; x represents a bond formed by the reaction of the monofunctional compound having a group capable of reacting with the isocyanate group with the isocyanate; and p is an integer of 2 or more.

When the terminals of a carbodiimide are blocked with a monofunctional compound having a group capable of reacting with an isocyanate group, for example, an amine, a carboxylic acid or an acid anhydride, the reaction between the isocyanate and the end-blocking agent may be effected before the carbodiimidization or may be effected after the carbodiimidization to a suitable degree of polymerization by adding the end-blocking agent in an amount equivalent to the residual isocyanate.

The present hydrolysis stabilizer for an ester group-containing resin comprises the above-mentioned carbodiimide as a main component, and in the actual use, the above carbodiimide may be used as a single component or may be used in combination with an appropriate adjuvant.

The present process for the hydrolysis stabilization of an ester group-containing resin comprises mixing the above-mentioned carbodiimide with the ester type resin. The mixing method is not critical and any appropriate mixing method can be adopted.

The proportion of the above carbodiimide to the ester group-containing resin is 0.01 to 5% by weight, preferably 0.3 to 1% by weight, and when the proportion is less than 0.01% by weight, the amount of the carbodiimide bond for the ester group becomes small, the hydrolysis stabilization effect cannot be said to be sufficient. When the proportion exceeds 5% by weight, the carbodiimide exhibits its plasticizing effect on the ester group-containing resin and adversely affects the physical properties of the resin.

Incidentally, as carbodiimides having particularly preferable hydrolysis resistance, there can be mentioned carbodiimides having a degree of polymerization of 5 to 30 obtained from HMDI and a monoisocyanate, for example, cyclohexyl isocyanate; end-blocked carbodiimides having a degree of polymerization of 5 to 30 obtained from HMDI and an amine, for example, cyclohexylamine; carbodiimides having a degree of polymerization of 5 to 30 derived from a mixture of HMDI: TMXDI=10:1–1:10 and end-blocked with a monoisocyanate such as cyclohexyl isocyanate or the like or an amine such as cyclohexylamine or the like; etc.

JP-A-07-017939 discloses isocyanate-terminated carbodiimides having a degree of polymerization (n) of 0 to 10 and an improved compatibility. However, this isocyanate is low in reactivity owing to steric hindrance and when the carbodiimide is mixed with the ester group-containing resin, the reaction of the isocyanate with the carboxyl or hydroxyl group present at the ends of the ester group-containing resin is slow and the isocyanate remains as such in the ester group-containing resin even after the melt-kneading. Therefore, there is such a problem that this isocyanate reacts with moisture to generate carbon dioxide, whereby voids and the like are formed in the ester group-containing resin.

On the other hand, in the case of the present hydrolysis stabilizer for an ester group-containing resin, the reactivity of the terminal isocyanate group of the carbodiimide resulting from HMDI, IPDI or a mixture of HMDI and IPDI which is the main component of the hydrolysis stabilizer, is sufficiently high even when the carbodiimide results from a mixture of TMXDI with HMDI, IPDI or a mixture of HMDI and IPDI. When the carbodiimide is melt-kneaded with the ester group-containing resin, the terminal isocyanate groups are consumed by the reaction with the carboxyl or hydroxyl group present at the ends of the ester group-containing resin, and there is substantially no case where the isocyanate remains as such in the ester group-containing resin after the melt-kneading. Therefore, there is no problem of voids and the like due to carbon dioxide.

Furthermore, JP-A-07-017939 discloses carbodiimides in which the terminal isocyanates are blocked with an alcohol or an amine. However, as described above, this carbodiimide is low in reactivity because of steric hindrance, and in order to obtain the desired hydrolysis stabilizing effect, it is necessary that the carbodiimide be added in an amount as large as possible within the limited addition amount range (when the amount of the carbodiimide added is too large, there appears a plasticizing effect on the ester group-containing resin). Accordingly, the blocking of the terminal isocyanate group with an alcohol or an amine results in an increase of molecular weight and also a decrease of the above-mentioned addition amount, and hence, is not desirable in view of the hydrolysis stabilizing effect.

On the other hand, in the case of the present hydrolysis stabilizer for an ester group-containing resin, the reactivity of the terminal isocyanate group of the carbodiimide which is the main component of the stabilizer, is sufficiently high as described above, and hence, even when the terminal isocyanate group is blocked with an alcohol or an amine to increase the molecular weight, a sufficient hydrolysis stabilizing effect is exhibited without increasing the addition amount so much.

DESCRIPTION OF THE PREFERRED EMBODIMENTS

Examples are shown below to explain the present invention in more detail.

Synthesis of carbodiimides

SYNTHESIS EXAMPLE 1

To 300 g of HMDI was added, as a carbodiimidization catalyst, 1.5 g of 3-methyl-1-phenyl-2-phosphorene-1-oxide (referred to hereinafter as carbodiimidization catalyst), and they were subjected to a condensation reaction at 180° C. for 10 hours in a nitrogen atmosphere to obtain a carbodiimide resulting from HMDI (degree of polymerization=3).

SYNTHESIS EXAMPLES 2 to 4

The same procedure as in Synthesis Example 1 was repeated, except that the reaction time was changed as shown in Table 1 to obtain carbodiimides as shown in Table 1.

TABLE 1

| Synthesis Example | Reaction time (hr) | Polymerization degree |
|---|---|---|
| 2 | 15 | 10 |
| 3 | 27 | 20 |
| 4 | 35 | 30 |

SYNTHESIS EXAMPLE 5

To 300 g of HMDI was added 1.5 g of the carbodiimidization catalyst and they were subjected to a reaction at 185° C. for 5 hours while nitrogen was bubbled thereinto, to obtain a carbodiimide resulting from HMDI (degree of polymerization =10).

SYNTHESIS EXAMPLES 6 to 8

The same procedure as in Synthesis Example 1 was repeated, except that the reaction time was changed as shown in Table 2 to obtain carbodiimides shown in Table 2.

TABLE 2

| Synthesis Example | Reaction time (hr) | Polymerization degree |
|---|---|---|
| 6 | 16 | 10 |
| 7 | 28 | 20 |
| 8 | 38 | 30 |

SYNTHESIS EXAMPLE 9

To a mixture of 236 g of HMDI with 25.0 g of cyclohexyl isocyanate (referred to hereinafter as CHI) was added 2.60 g of the carbodiimidization catalyst, and they were subjected to a reaction at 185° C. for 19 hours while nitrogen was bubbled thereinto, to obtain a carbodiimide resulting from HMDI and CHI (degree of polymerization=10).

SYNTHESIS EXAMPLES 10 to 14

The starting materials and the reaction conditions were changed as shown in Table 3 to obtain carbodiimides shown CHI means a cyclohexyl isocyanate.

TABLE 3

| Synthesis Example | 10 | 11 | 12 | 13 | 14 |
|---|---|---|---|---|---|
| Diisocyanate | HMDI | HMDI | IPDI | IPDI | IPDI |
| Amount (g) | 498 | 760 | 200 | 400 | 622 |
| Monoisocyanate | CHI | CHI | CHI | CHI | CHI |
| Amount (g) | 25 | 25 | 25 | 25 | 25 |
| Catalyst amount (g) | 5.2 | 7.8 | 2.3 | 4.3 | 6.2 |
| Reaction time (hr) | 20 | 48 | 21 | 27 | 52 |
| Polymerization degree | 20 | 30 | 10 | 20 | 30 |

SYNTHESIS EXAMPLE 15

To 288 g of HMDI was added 20 g of cyclohexylamine and they were stirred at 100° C. for one hour while nitrogen was bubbled thereinto and subsequently 2.9 g of the carbodiimidization catalyst was added thereto, after which the resulting mixture was subjected to a reaction at 185° C. for 30 hours, to obtain a carbodiimide resulting from HMDI and having terminal urea bonds (degree of polymerization=10).

SYNTHESIS EXAMPLES 16 to 30

The end-blocking agent was changed to an alcohol, an amine, a carboxylic acid or an acid anhydride as shown in Tables 4, 5 and 6, and in the same manner as in Synthesis Example 13, there were obtained carbodiimides having a urea bond, a urethane bond, an imido bond or an amido bond in the molecular chain as shown in Tables 4, 5 and 6.

TABLE 4

| Synthesis Example | 16 | 17 | 18 | 19 | 20 |
|---|---|---|---|---|---|
| Diisocyanate | HMDI | IPDI | IPDI | HMDI | HMDI |
| Amount (g) | 498 | 245 | 467 | 288 | 498 |
| Blocking agent | Cyclo-hexyl-amine | Do. | Do. | Cyclohexyl-carboxylic acid | Do. |
| Amount (g) | 20 | 20 | 20 | 26 | 26 |
| Catalyst amount (g) | 5.5 | 2.5 | 4.7 | 2.9 | 5.5 |
| Reaction time (hr) | 52 | 30 | 50 | 32 | 48 |
| Polymerization degree | 20 | 10 | 20 | 10 | 20 |

TABLE 5

| Synthesis Example | 21 | 22 | 23 | 24 | 25 |
|---|---|---|---|---|---|
| Diisocyanate | HMDI | HMDI | HMDI | HMDI | HMDI |
| Amount (g) | 288 | 498 | 288 | 498 | 288 |
| Blocking agent | Phthalic anhydride | Do. | Benzoic acid | Do. | Dibutyl-amine |
| Amount (g) | 30 | 30 | 24 | 24 | 26 |
| Catalyst amount (g) | 2.9 | 5.5 | 2.9 | 5.5 | 2.9 |
| Reaction time (hr) | 35 | 52 | 31 | 50 | 32 |
| Polymerization degree | 10 | 20 | 10 | 20 | 10 |

TABLE 6

| Synthesis Example | 26 | 27 | 28 | 29 | 30 |
|---|---|---|---|---|---|
| Diisocyanate | HMDI | IPDI | IPDI | IPDI | IPDI |
| Amount (g) | 498 | 245 | 467 | 245 | 467 |

TABLE 6-continued

| Synthesis Example | 26 | 27 | 28 | 29 | 30 |
|---|---|---|---|---|---|
| Blocking agent | Di-butyl-amine | Cyclohexyl-carboxylic acid | Do. | Phthalic anhydride | Do. |
| Amount (g) | 26 | 26 | 26 | 30 | 30 |
| Catalyst amount (g) | 5.5 | 2.5 | 4.7 | 2.5 | 4.7 |
| Reaction time (hr) | 48 | 30 | 50 | 30 | 50 |
| Polymerization degree | 20 | 10 | 20 | 10 | 20 |

EXAMPLE 1

A polybutylene terephthalate [PBT] manufactured by DAINIPPON INK & CHEMICALS INC. (Product No. BT-1000) was melt-kneaded with 1% by weight of the present hydrolysis stabilizer for an ester group-containing resin which comprised as the main component one of the carbodiimides obtained in Synthesis Examples 1 to 30, by means of a twin screw extruder and injection molded into JIS-K6301 Dumbbell No. 4. The sample thus obtained was immersed in hot water at 95° C. and the tensile strength of the sample was measured by a tensile tester every time shown in Table 7. The results are shown in Tables 7 to 9 [incidentally, in Tables 7 to 9, the numerals in the uppermost section refer to Synthesis Example Nos. in which the carbodiimide was synthesized, and the term "blank" means a sample in which no present hydrolysis stabilizer for an ester group-containing resin was used (the same applies hereinafter)].

EXAMPLE 2

To a urethane elastomer manufactured by Nisshinbo Industries, Inc. (Reference No. F-30) was added 1% by weight of the present hydrolysis stabilizer for an ester group-containing resin comprising as the main component one of the carbodiimides in Synthesis Examples 1 to 30, and the resulting mixture was molded into a film by a cast method, after which the film was punched to JIS-K6301 Dumbbell No. 4. The sample thus obtained was immersed in hot water at 95° C. and the tensile strength of the sample was measured by a tensile tester every time shown in Tables 10 to 12. The results are shown in Tables Table 10 to 12.

TABLE 7

| t/day | blank | 1 | 2 | 3 | 4 | 5 | 6 | 7 | 8 | 9 |
|---|---|---|---|---|---|---|---|---|---|---|
| 0 | 610 | 610 | 610 | 610 | 620 | 610 | 610 | 610 | 610 | 610 |
| 10 | 410 | 520 | 540 | 540 | 540 | 520 | 530 | 530 | 540 | 570 |
| 15 | 250 | 400 | 420 | 430 | 430 | 400 | 420 | 420 | 420 | 460 |
| 20 | 150 | 200 | 230 | 230 | 230 | 190 | 220 | 230 | 230 | 260 |
| 30 | 100 | 150 | 170 | 170 | 170 | 140 | 170 | 170 | 170 | 190 |

(Kg/cm²)

TABLE 8

| t/day | 10 | 11 | 12 | 13 | 14 | 15 | 16 | 17 | 18 | 19 |
|---|---|---|---|---|---|---|---|---|---|---|
| 0 | 610 | 620 | 610 | 610 | 610 | 610 | 610 | 610 | 610 | 610 |
| 10 | 580 | 590 | 560 | 570 | 570 | 580 | 580 | 560 | 560 | 560 |
| 15 | 470 | 480 | 450 | 460 | 460 | 470 | 470 | 450 | 450 | 450 |
| 20 | 260 | 270 | 250 | 260 | 260 | 260 | 270 | 250 | 250 | 240 |
| 30 | 200 | 200 | 190 | 190 | 200 | 200 | 200 | 180 | 190 | 170 |

(Kg/cm²)

TABLE 9

| t/day | 20 | 21 | 22 | 23 | 24 | 25 | 26 | 27 | 28 | 29 | 30 |
|---|---|---|---|---|---|---|---|---|---|---|---|
| 0 | 610 | 610 | 610 | 610 | 610 | 600 | 600 | 610 | 600 | 610 | 610 |
| 10 | 560 | 560 | 570 | 560 | 560 | 570 | 570 | 550 | 560 | 560 | 560 |
| 15 | 450 | 450 | 450 | 450 | 450 | 460 | 460 | 440 | 450 | 440 | 450 |
| 20 | 250 | 250 | 250 | 240 | 250 | 260 | 270 | 240 | 240 | 240 | 250 |
| 30 | 180 | 180 | 180 | 170 | 180 | 190 | 200 | 170 | 170 | 170 | 170 |

(Kg/cm²)

TABLE 10

| t/day | blank | 1 | 2 | 3 | 4 | 5 | 6 | 7 | 8 | 9 |
|---|---|---|---|---|---|---|---|---|---|---|
| 0 | 870 | 880 | 880 | 890 | 890 | 870 | 880 | 880 | 880 | 870 |
| 3 | 520 | 650 | 660 | 660 | 660 | 640 | 650 | 650 | 660 | 710 |
| 7 | 140 | 570 | 580 | 590 | 590 | 560 | 570 | 570 | 570 | 590 |
| 10 | — | 510 | 520 | 530 | 530 | 500 | 510 | 500 | 510 | 530 |
| 15 | — | 190 | 200 | 200 | 200 | 110 | 110 | 200 | 210 | 210 |

(Kg/cm$^2$)

TABLE 11

| t/day | 10 | 11 | 12 | 13 | 14 | 15 | 16 | 17 | 18 | 19 | 20 |
|---|---|---|---|---|---|---|---|---|---|---|---|
| 0 | 880 | 880 | 880 | 880 | 880 | 870 | 870 | 870 | 870 | 870 | 870 |
| 3 | 710 | 720 | 710 | 710 | 710 | 710 | 710 | 700 | 700 | 710 | 710 |
| 7 | 600 | 600 | 590 | 590 | 600 | 350 | 350 | 320 | 350 | 580 | 580 |
| 10 | 530 | 530 | 520 | 540 | 540 | 320 | 340 | 300 | 310 | 500 | 500 |
| 15 | 240 | 250 | 200 | 190 | 200 | 110 | 130 | 100 | 120 | 190 | 200 |

(Kg/cm$^2$)

TABLE 12

| t/day | 21 | 22 | 23 | 24 | 25 | 26 | 27 | 28 | 29 | 30 |
|---|---|---|---|---|---|---|---|---|---|---|
| 0 | 870 | 870 | 870 | 870 | 880 | 880 | 870 | 870 | 870 | 870 |
| 3 | 700 | 710 | 710 | 710 | 710 | 720 | 670 | 670 | 670 | 640 |
| 7 | 560 | 570 | 570 | 570 | 570 | 580 | 530 | 550 | 540 | 550 |
| 10 | 500 | 510 | 500 | 510 | 510 | 510 | 470 | 480 | 510 | 510 |
| 15 | 180 | 190 | 170 | 180 | 170 | 180 | 140 | 170 | 170 | 180 |

(Kg/cm$^2$)

—: destructed

EXAMPLE 3

A polybutylene terephthalate [PBT] elastomer manufactured by DAINIPPON INK & CHEMICALS, INC. (Product No. GRILUX [registered trademark] EH-700) and 0.5% by weight of the present hydrolysis stabilizer for an ester group-containing resin comprising as the main component one of the carbodiimides obtained in Synthesis Examples 1 to 30 were melt-mixed and extruded using a twin screw extruder and then formed into a film of about 500 μm using a T-die, after which the film thus obtained was injection molded into JIS-K6301 Dumbbell No. 4. The sample thus obtained was immersed in hot water at 95° C. and the tensile strength was measured by a tensile tester every time shown in Tables 13 to 15. The results are shown in Tables 13 to 15.

TABLE 13

| t/day | blank | 1 | 2 | 3 | 4 | 5 | 6 | 7 | 8 | 9 | 10 |
|---|---|---|---|---|---|---|---|---|---|---|---|
| 0 | 350 | 350 | 350 | 350 | 350 | 350 | 350 | 350 | 350 | 350 | 350 |
| 10 | 330 | 350 | 350 | 350 | 350 | 340 | 340 | 340 | 350 | 350 | 350 |
| 15 | 310 | 340 | 350 | 350 | 350 | 330 | 340 | 340 | 340 | 350 | 350 |
| 20 | 290 | 320 | 330 | 340 | 340 | 320 | 330 | 340 | 340 | 350 | 350 |
| 30 | 220 | 320 | 330 | 330 | 340 | 310 | 320 | 330 | 330 | 340 | 340 |

(Kg/cm$^2$)

TABLE 14

| t/day | 11 | 12 | 13 | 14 | 15 | 16 | 17 | 18 | 19 | 20 | 21 |
|---|---|---|---|---|---|---|---|---|---|---|---|
| 0 | 350 | 350 | 350 | 350 | 350 | 350 | 350 | 350 | 350 | 350 | 350 |
| 10 | 350 | 350 | 350 | 350 | 350 | 350 | 350 | 350 | 340 | 340 | 340 |
| 15 | 350 | 350 | 350 | 350 | 350 | 350 | 350 | 340 | 340 | 340 | 340 |
| 20 | 350 | 340 | 340 | 340 | 350 | 350 | 340 | 340 | 330 | 330 | 320 |
| 30 | 340 | 330 | 340 | 340 | 340 | 340 | 330 | 330 | 320 | 320 | 310 |

(Kg/cm$^2$)

TABLE 15

| t/day | 22 | 23 | 24 | 25 | 26 | 27 | 28 | 29 | 30 |
|---|---|---|---|---|---|---|---|---|---|
| 0 | 350 | 350 | 350 | 350 | 350 | 350 | 350 | 350 | 350 |
| 10 | 340 | 340 | 340 | 350 | 350 | 340 | 340 | 340 | 340 |
| 15 | 340 | 330 | 330 | 340 | 340 | 330 | 330 | 320 | 330 |
| 20 | 320 | 310 | 320 | 330 | 340 | 320 | 320 | 310 | 310 |
| 30 | 310 | 300 | 310 | 320 | 320 | 300 | 300 | 300 | 300 |

($Kg/cm^2$)

EXAMPLE 4

A polyethylene terephthalate [PET] resin manufactured by KANEBO LTD. (Product No. EFG-7) and 0.5% by weight of the present hydrolysis stabilizer for an ester group-containing resin comprising as the main component one of the carbodiimides obtained in Synthesis Examples 1 to 30 were melt-mixed and extruded using a twin screw extruder and then formed into a film of about 500 μm using a T-die, after which the film thus obtained was injection molded into JIS-K6301 Dumbbell No. 4. The sample thus obtained was immersed in hot water at 95° C. and the tensile strength was measured by a tensile tester every time shown in Tables 16 to 18. The results are shown in Tables 16 to 18.

TABLE 16

| t/day | blank | 1 | 2 | 3 | 4 | 5 | 6 | 7 | 8 | 9 | 10 |
|---|---|---|---|---|---|---|---|---|---|---|---|
| 0 | 630 | 630 | 630 | 630 | 630 | 630 | 630 | 630 | 630 | 630 | 630 |
| 10 | 640 | 650 | 650 | 640 | 650 | 650 | 650 | 650 | 650 | 650 | 640 |
| 30 | 590 | 650 | 650 | 650 | 650 | 650 | 650 | 650 | 650 | 650 | 650 |
| 60 | 460 | 630 | 640 | 640 | 640 | 620 | 630 | 640 | 640 | 650 | 650 |

($Kg/cm^2$)

TABLE 17

| t/day | 11 | 12 | 13 | 14 | 15 | 16 | 17 | 18 | 19 | 20 | 21 |
|---|---|---|---|---|---|---|---|---|---|---|---|
| 0 | 630 | 630 | 630 | 630 | 630 | 630 | 630 | 630 | 630 | 630 | 630 |
| 10 | 650 | 640 | 650 | 650 | 650 | 650 | 650 | 650 | 650 | 650 | 650 |
| 30 | 650 | 650 | 650 | 650 | 650 | 650 | 650 | 650 | 650 | 650 | 650 |
| 60 | 650 | 620 | 630 | 630 | 640 | 650 | 620 | 620 | 600 | 600 | 600 |

($Kg/cm^2$)

TABLE 18

| t/day | 22 | 23 | 24 | 25 | 26 | 27 | 28 | 29 | 30 |
|---|---|---|---|---|---|---|---|---|---|
| 0 | 630 | 630 | 630 | 630 | 630 | 630 | 630 | 630 | 630 |
| 10 | 650 | 650 | 650 | 650 | 650 | 650 | 650 | 650 | 650 |
| 30 | 650 | 650 | 650 | 650 | 650 | 650 | 650 | 650 | 650 |
| 60 | 620 | 600 | 600 | 640 | 640 | 600 | 600 | 600 | 600 |

($Kg/cm^2$)

Synthesis of carbodiimides

SYNTHESIS EXAMPLES 31 to 39

To one of the diisocyanate mixtures shown in Tables 19 and 20 was added 1.5% by weight, based on the total weight of the isocyanates, of the carbodiimidization catalyst and the resulting mixture was heated at 185° C. to be subjected to a reaction until the degree of polymerization (n) became 10.

TABLE 19

| Synthesis Example | 31 | 32 | 33 | 34 | 35 | 36 |
|---|---|---|---|---|---|---|
| Diisocyanate | HMDI | HMDI | HMDI | IPDI | IPDI | IPDI |
| Amount (g) | 65.5 | 131.0 | 196.5 | 55.6 | 111.1 | 166.7 |
|  | TMXDI | TMXDI | TMXDI | TMXDI | TMXDI | TMXDI |
|  | 183.0 | 122.0 | 61.0 | 183.0 | 122.0 | 61.0 |
| Monoisocyanate | Not used | Not used | Not used | Not used | Not used | Not used |
| Catalyst amount (g) | 3.7 | 3.8 | 3.9 | 3.6 | 3.5 | 3.4 |
| Reaction time (hr) | 30 | 25 | 20 | 30 | 26 | 20 |
| Polymerization degree | 10 | 10 | 10 | 10 | 10 | 10 |

TABLE 20

| Synthesis Example | 37 | 38 | 39 |
|---|---|---|---|
| Diisocyanate | HMDI | HMDI | HMDI |
| Amount (g) | 65.5 | 131.0 | 196.5 |
|  | IPDI | IPDI | IPDI |
|  | 166.7 | 111.1 | 55.6 |

TABLE 20-continued

| Synthesis Example | 37 | 38 | 39 |
|---|---|---|---|
| Monoisocyanate | Not used | Not used | Not used |
| Catalyst amount (g) | 3.5 | 3.6 | 3.8 |
| Reaction time (hr) | 20 | 19 | 19 |
| Polymerization degree | 10 | 10 | 10 |

SYNTHESIS EXAMPLES 40 to 48

To one of the mixtures shown in Tables 21 and 22 was added cyclohexyl isocyanate so that the degree of polymerization (n) becomes 10 (diisocyanate:monoisocyanate=9:2 by mole), and the carbodiimidization catalyst was added in a proportion of 1.5% by weight based on the total weight of the isocyanates, after which the resulting mixture was heated at 185° C. to be subjected to a reaction until the peak of the isocyanate disappeared in the infrared absorption (IR) spectrum.

TABLE 21

| Synthesis Example | 40 | 41 | 42 |
|---|---|---|---|
| Diisocyanate | HMDI | HMDI | HMDI |
| Amount (g) | 65.5 | 131.0 | 196.5 |
|  | TMXDI | TMXDI | TMXDI |
|  | 183.0 | 122.0 | 61.0 |
| Monoisocyanate | Cyclohexyl isocyanate | Cyclohexyl isocyanate | Cyclohexyl isocyanate |
| Amount (g) | 27.8 | 27.8 | 27.8 |
| Catalyst amount (g) | 4.1 | 4.2 | 4.3 |
| Reaction time (hr) | 28 | 24 | 19 |
| Polymerization degree | 10 | 10 | 10 |

TABLE 22

| Synthesis Example | 43 | 44 | 45 | 46 | 47 | 48 |
|---|---|---|---|---|---|---|
| Diisocyanate | IPDI | IPDI | IPDI | HMDI | HMDI | HMDI |
| Amount (g) | 55.6 | 111.1 | 166.7 | 65.5 | 131.0 | 196.5 |
|  | TMXDI | TMXDI | TMXDI | IPDI | IPDI | IPDI |
|  | 183.0 | 122.0 | 61.0 | 166.7 | 111.1 | 55.6 |
| Monoisocyanate | Cyclohexyl isocyanate | Cyclohexyl isocyanate | Cyclohexyl isocyanate | Cyclohexyl isocyanate | Cyclohexyl isocyanate | Cyclohexyl isocyanate |
| Amount (g) | 27.8 | 27.8 | 27.8 | 27.8 | 27.8 | 27.8 |
| Catalyst amount (g) | 4.0 | 3.9 | 3.8 | 3.5 | 3.6 | 3.8 |
| Reaction time (hr) | 30 | 25 | 20 | 21 | 20 | 20 |
| Polymerization degree | 10 | 10 | 10 | 10 | 10 | 10 |

SYNTHESIS EXAMPLES 49 to 57

To one of the mixtures shown in Tables 23 and 24 was added cyclohexylamine so that the degree of polymerization (n) became 10 (diisocyanate:amine=11:2 by mole), and the carbodiimidization catalyst was added in a proportion of 1.5% by weight based on the total weight of the isocyanates, after which the resulting mixture was heated at 185° C. to be subjected to a reaction until the peak of the isocyanate disappeared in IR.

TABLE 23

| Synthesis Example | 49 | 50 | 51 | 52 | 53 | 54 |
|---|---|---|---|---|---|---|
| Diisocyanate | HMDI | HMDI | HMDI | IPDI | IPDI | IPDI |
| Amount (g) | 65.5 | 131.0 | 196.5 | 55.6 | 111.1 | 166.7 |
|  | TMXDI | TMXDI | TMXDI | TMXDI | TMXDI | TMXDI |
|  | 183.0 | 122.0 | 61.0 | 183.0 | 122.0 | 61.0 |
| Amine | Cyclohexylamine | Cyclohexylamine | Cyclohexylamine | Cyclohexylamine | Cyclohexylamine | Cyclohexylamine |
| Amount (g) | 22.0 | 22.0 | 22.0 | 22.0 | 22.0 | 22.0 |
| Catalyst amount (g) | 3.7 | 3.8 | 3.9 | 3.6 | 3.5 | 3.4 |
| Reaction time (hr) | 29 | 25 | 19 | 30 | 25 | 20 |
| Polymerization degree | 9 | 9 | 9 | 9 | 9 | 9 |

TABLE 24

| Synthesis Example | 55 | 56 | 57 |
|---|---|---|---|
| Diisocyanate | HMDI | HMDI | HMDI |
| Amount (g) | 65.5 | 131.3 | 196.5 |
|  | IPDI | IPDI | IPDI |
|  | 166.7 | 111.1 | 55.6 |
| Amine | Cyclohexylamine | Cyclohexylamine | Cyclohexylamine |
| Amount (g) | 22.0 | 22.0 | 22.0 |
| Catalyst amount (g) | 3.5 | 3.6 | 3.8 |
| Reaction time (hr) | 19 | 22 | 20 |
| Polymerization degree | 9 | 9 | 9 |

SYNTHESIS EXAMPLES 58 to 66

To one of the mixtures shown in Tables 25 and 26 was added cyclohexyl isocyanate so that the degree of polymerization (n) became 20 (diisocyanate:monoisocyanate=19:2 by mole) and the carbodiimidization catalyst was added in a proportion of 1.5% by weight based on the total weight of the isocyanates, after which the resulting mixture was heated at 185° C. to be subjected to a reaction until the peak of the isocyanate disappeared in IR.

TABLE 25

| Synthesis Example | 58 | 59 | 60 |
|---|---|---|---|
| Diisocyanate | HMDI | HMDI | HMDI |
| Amount (g) | 65.5 | 131.0 | 196.5 |
|  | TMXDI | TMXDI | TMXDI |
|  | 183.0 | 122.0 | 61.0 |
| Monoisocyanate | Cyclohexyl isocyanate | Cyclohexyl isocyanate | Cyclohexyl isocyanate |
| Amount (g) | 13.2 | 13.2 | 13.2 |
| Catalyst amount (g) | 3.9 | 4.0 | 4.1 |
| Reaction time (hr) | 30 | 24 | 21 |
| Polymerization degree | 20 | 20 | 20 |

TABLE 26

| Synthesis Example | 61 | 62 | 63 | 64 | 65 | 66 |
|---|---|---|---|---|---|---|
| Diisocyanate | IPDI | IPDI | IPDI | HMDI | HMDI | HMDI |
| Amount (g) | 55.6 | 111.1 | 166.7 | 65.5 | 131.0 | 196.5 |
|  | TMXDI | TMXDI | ThXDI | IPDI | IPDI | IPDI |
|  | 183.0 | 122.0 | 61.0 | 166.7 | 111.1 | 55.6 |
| Monoisocyanate | Cyclohexyl isocyanate | Cyclohexyl isocyanate | Cyclohexyl isocyanate | Cyclohexyl isocyanate | Cyclohexyl isocyanate | Cyclohexyl isocyanate |
| Amount (g) | 13.2 | 13.2 | 13.2 | 13.2 | 13.2 | 13.2 |
| Catalyst amount (g) | 3.8 | 3.7 | 3.6 | 3.7 | 3.8 | 4.0 |
| Reaction time (hr) | 29 | 24 | 20 | 23 | 19 | 20 |
| Polymerization degree | 20 | 20 | 20 | 20 | 20 | 20 |

SYNTHESIS EXAMPLES 67 to 75

To one of the mixtures shown in Tables 27 and 28 was added cyclohexylamine so that the degree of polymerization (n) became 20 (diisocyanate: amine=21:2 by mole), and the carbodiimidization catalyst was added in a proportion of 1.5% by weight based on the total weight of the isocyanates, after which the resulting mixture was heated at 185° C. to be subjected to a reaction until the peak of the isocyanate disappeared in IR.

TABLE 27

| Synthesis Example | 67 | 68 | 69 | 70 | 71 | 72 |
|---|---|---|---|---|---|---|
| Diisocyanate Amount (g) | HMDI 65.5 TMXDI 183.0 | HMDI 131.0 TMXDI 122.0 | HMDI 196.5 TMXDI 61.0 | IPDI 55.6 TMXDI 183.0 | IPDI 111.1 TMXDI 122.0 | IPDI 166.7 TMXDI 61.0 |
| Amine Amount (g) | Cyclohexyl amine 10.4 | Cyclohexyl amine 10.4 | Cyclohexyl amine 10.4 | Cyclohexyl amine 10.4 | Cyclohexyl amine 10.4 | Cyclohexyl amine 10.4 |
| Catalyst amount (g) | 3.7 | 3.8 | 3.9 | 3.6 | 3.5 | 3.4 |
| Reaction time (hr) | 52 | 50 | 48 | 51 | 50 | 50 |
| Polymerization degree | 19 | 19 | 19 | 19 | 19 | 19 |

TABLE 28

| Synthesis Example | 73 | 74 | 75 |
|---|---|---|---|
| Diisocyanate Amount (g) | HMDI 65.5 IPDI 166.7 | HMDI 131.0 IPDI 111.1 | HMDI 196.5 IPDI 55.6 |
| Amine Amount (g) | Cyclohexyl amine 10.4 | Cyclohexyl amine 10.4 | Cyclohexyl amine 10.4 |
| Catalyst amount (g) | 3.5 | 3.6 | 3.8 |
| Reaction time (hr) | 47 | 48 | 48 |
| Polymerization degree | 19 | 19 | 19 |

SYNTHESIS EXAMPLES 76 to 84

To one of the mixtures shown in Tables 29 and 30 was added cyclohexylcarboxylic acid so that the degree of polymerization (n) became 9 (diisocyanate:cyclohexylcarboxylic acid=10:2 by mole), and the carbodiimidization catalyst was added in a proportion of 1.5% by weight based on the total weight of the isocyanates, after which the resulting mixture was heated at 185° C. to be subjected to a reaction until the peak of the isocyanate disappeared in IR.

TABLE 29

| Synthesis Example | 76 | 77 | 78 |
|---|---|---|---|
| Diisocyanate Amount (g) | HMDI 65.5 TMXDI 183.0 | HMDI 131.0 TMXDI 122.0 | HMDI 196.5 TMXDI 61.0 |
| Carboxylic acid Amount (g) | Cyclohexyl carboxylic acid 28.5 | Cyclohexyl carboxylic acid 28.5 | Cyclohexyl carboxylic acid 28.5 |
| Catalyst amount (g) | 3.7 | 3.8 | 3.9 |
| Reaction time (hr) | 30 | 25 | 20 |
| Polymerization degree | 9 | 9 | 9 |

TABLE 30

| Synthesis Example | 79 | 80 | 81 | 82 | 83 | 84 |
|---|---|---|---|---|---|---|
| Diisocyanate Amount (g) | IPDI 55.6 TMXDI 183.0 | IPDI 111.1 TMXDI 122.0 | IPDI 166.7 TMXDI 61.0 | HMDI 65.5 IPDI 166.7 | HMDI 131.0 IPDI 111.1 | HMDI 196.5 IPDI 55.6 |
| Carboxylic acid Amount (g) | Cyclohexyl carboxylic acid 28.5 | Cyclohexyl carboxylic acid 28.5 | Cyclohexyl carboxylic acid 28.5 | Cyclohexyl carboxylic acid 28.5 | Cyclohexyl carboxylic acid 28.5 | Cyclohexyl carboxylic acid 28.5 |
| Catalyst amount (g) | 3.6 | 3.5 | 3.4 | 3.5 | 3.6 | 3.8 |
| Reaction time (hr) | 30 | 26 | 20 | 20 | 19 | 19 |
| Polymerization degree | 9 | 9 | 9 | 9 | 9 | 9 |

SYNTHESIS EXAMPLES 85 to 92

To one of the mixtures shown in Tables 31 and 32 was added phthalic anhydride so that the degree of polymerization (n) became 9 (diisocyanate:phthalic anhydride=10:2 by mole), and the carbodiimidization catalyst was added in a proportion of 1.5% by weight based on the total weight of the isocyanates, after which the resulting mixture was heated at 185° C. to be subjected to a reaction until the peak of the isocyanate disappeared in IR.

TABLE 31

| Synthesis Example | 85 | 86 | 87 | 88 | 89 | 90 |
|---|---|---|---|---|---|---|
| Diisocyanate Amount (g) | HMDI 65.5 TMXDI 183.0 | HMDI 131.0 TMXDI 122.0 | HMDI 196.5 TMXDI 61.0 | IPDI 55.6 TMXDI 183.0 | IPDI 111.1 TMXDI 122.0 | IPDI 166.7 TMXDI 61.0 |
| Acid anhydride Amount (g) | Phthalic anhydride 32.9 | Phthalic anhydride 32.9 | Phthalic anhydride 32.9 | Phthalic anhydride 32.9 | Phthalic anhydride 32.9 | Phthalic anhydride 32.9 |
| Catalyst amount (g) | 3.7 | 3.8 | 3.9 | 3.6 | 3.5 | 3.4 |
| Reaction time (hr) | 28 | 24 | 19 | 30 | 25 | 20 |
| Polymerization degree | 9 | 9 | 9 | 9 | 9 | 9 |

TABLE 32

| Synthesis Example | 90 | 91 | 92 |
|---|---|---|---|
| Diisocyanate Amount (g) | HMDI 65.5 IPDI 166.7 | HMDI 131.0 IPDI 111.1 | HMDI 196.5 IPDI 55.6 |
| Acid anhydride Amount (g) | Phthalic anhydride 32.9 | Phthalic anhydride 32.9 | Phthalic anhydride 32.9 |
| Catalyst amount (g) | 3.5 | 3.6 | 3.8 |
| Reaction time (hr) | 21 | 20 | 20 |
| Polymerization degree | 9 | 9 | 9 |

EXAMPLE 5

A polybutylene terephthalate [PBT] manufactured by DAINIPPON INK & CHEMICALS, INC. (Product No. BT-1000) and 1% by weight of the present hydrolysis stabilizer for an ester group-containing resin comprising as the main component one of the carbodiimides obtained in Synthesis Examples 31 to 92 were melt-kneaded using a twin screw extruder and then injection molded into JIS-K6301 Dumbbell No. 4. The sample thus obtained was immersed in hot water at 95° C. and the tensile strength was measured by a tensile tester every time shown in Tables 33 to 38. The results are shown in Tables 33 to 38.

TABLE 33

| t/day | 31 | 32 | 33 | 34 | 35 | 36 | 37 | 38 | 39 | 40 | 41 |
|---|---|---|---|---|---|---|---|---|---|---|---|
| 0 | 610 | 620 | 620 | 610 | 620 | 620 | 620 | 620 | 620 | 620 | 620 |
| 10 | 540 | 550 | 540 | 540 | 530 | 530 | 540 | 530 | 520 | 570 | 580 |
| 15 | 410 | 420 | 420 | 420 | 430 | 420 | 430 | 420 | 430 | 450 | 460 |
| 20 | 230 | 240 | 230 | 250 | 240 | 240 | 230 | 230 | 240 | 250 | 260 |
| 30 | 180 | 170 | 180 | 170 | 170 | 180 | 180 | 180 | 170 | 180 | 190 |

(Kg/cm$^2$)

TABLE 34

| t/day | 42 | 43 | 44 | 45 | 46 | 47 | 48 | 49 | 50 | 51 | 52 |
|---|---|---|---|---|---|---|---|---|---|---|---|
| 0 | 610 | 610 | 610 | 610 | 620 | 610 | 620 | 610 | 610 | 620 | 610 |
| 10 | 580 | 590 | 570 | 580 | 570 | 590 | 590 | 530 | 560 | 540 | 540 |
| 15 | 470 | 470 | 480 | 470 | 460 | 470 | 480 | 430 | 440 | 420 | 420 |
| 20 | 270 | 270 | 460 | 270 | 250 | 270 | 280 | 240 | 250 | 250 | 240 |
| 30 | 190 | 180 | 190 | 200 | 190 | 180 | 180 | 170 | 180 | 180 | 170 |

(Kg/cm$^2$)

TABLE 35

| t/day | 53 | 54 | 55 | 56 | 57 | 58 | 59 | 60 | 61 | 62 | 63 |
|---|---|---|---|---|---|---|---|---|---|---|---|
| 0 | 610 | 620 | 610 | 620 | 610 | 610 | 610 | 610 | 620 | 610 | 610 |
| 10 | 560 | 540 | 530 | 540 | 560 | 560 | 570 | 580 | 570 | 590 | 590 |
| 15 | 440 | 420 | 450 | 450 | 440 | 470 | 480 | 470 | 460 | 470 | 470 |
| 20 | 250 | 250 | 240 | 240 | 230 | 270 | 260 | 270 | 250 | 270 | 270 |
| 30 | 180 | 180 | 180 | 170 | 170 | 180 | 190 | 200 | 190 | 180 | 180 |

(Kg/cm$^2$)

TABLE 36

| t/day | 64 | 65 | 66 | 67 | 68 | 69 | 70 | 71 | 72 | 73 | 74 |
|---|---|---|---|---|---|---|---|---|---|---|---|
| 0 | 610 | 610 | 610 | 620 | 610 | 620 | 610 | 610 | 620 | 610 | 620 |
| 10 | 570 | 680 | 570 | 540 | 530 | 540 | 560 | 590 | 540 | 530 | 540 |
| 15 | 480 | 470 | 480 | 420 | 450 | 450 | 440 | 470 | 420 | 450 | 450 |
| 20 | 260 | 260 | 260 | 250 | 240 | 240 | 230 | 270 | 250 | 240 | 240 |
| 30 | 190 | 180 | 190 | 180 | 180 | 170 | 170 | 180 | 180 | 180 | 170 |

(Kg/cm$^2$)

TABLE 37

| t/day | 75 | 76 | 77 | 78 | 79 | 80 | 81 | 82 | 83 | 84 | 85 |
|---|---|---|---|---|---|---|---|---|---|---|---|
| 0 | 610 | 600 | 610 | 610 | 600 | 610 | 600 | 610 | 600 | 610 | 600 |
| 10 | 570 | 520 | 520 | 530 | 530 | 530 | 520 | 530 | 520 | 520 | 530 |
| 15 | 470 | 420 | 430 | 430 | 440 | 430 | 430 | 420 | 430 | 430 | 430 |
| 20 | 250 | 220 | 230 | 210 | 220 | 230 | 230 | 240 | 230 | 230 | 230 |
| 30 | 180 | 130 | 140 | 130 | 140 | 150 | 150 | 130 | 140 | 140 | 140 |

(Kg/cm$^2$)

TABLE 38

| t/day | 86 | 87 | 88 | 89 | 90 | 91 | 92 |
|---|---|---|---|---|---|---|---|
| 0 | 610 | 600 | 610 | 610 | 610 | 610 | 610 |
| 10 | 530 | 530 | 520 | 530 | 530 | 520 | 520 |
| 15 | 440 | 430 | 430 | 440 | 430 | 430 | 440 |

TABLE 38-continued

| t/day | 86 | 87 | 88 | 89 | 90 | 91 | 92 |
|---|---|---|---|---|---|---|---|
| 20 | 220 | 230 | 230 | 220 | 230 | 230 | 240 |
| 30 | 140 | 150 | 150 | 140 | 150 | 150 | 150 |
| | | | | | | | (Kg/cm$^2$) |

EXAMPLE 6

To a urethane elastomer manufactured by Nisshinbo Industries Inc. (Product No. F-30) was added 1% by weight of the present hydrolysis stabilizer for an ester group-containing resin comprising as the main component one of the carbodiimides obtained in Synthesis Examples 31 to 92 and then the resulting mixture was formed into a film by a cast method, after which the film was punched to obtain JIS-K6301 Dumbbell No. 4. The sample thus obtained was immersed in hot water at 95° C. and the tensile strength was measured by a tensile tester every time shown in Tables 39 to 44. The results are shown in Tables 39 to 44.

TABLE 39

| t/day | 31 | 32 | 33 | 34 | 35 | 36 | 37 | 38 | 39 | 40 | 41 |
|---|---|---|---|---|---|---|---|---|---|---|---|
| 0 | 890 | 890 | 880 | 880 | 870 | 880 | 890 | 880 | 890 | 890 | 880 |
| 3 | 650 | 640 | 650 | 670 | 650 | 640 | 650 | 640 | 650 | 710 | 700 |
| 7 | 580 | 590 | 590 | 580 | 600 | 590 | 580 | 590 | 580 | 600 | 600 |
| 10 | 530 | 530 | 540 | 530 | 520 | 520 | 510 | 520 | 520 | 530 | 510 |
| 15 | 180 | 170 | 160 | 150 | 160 | 170 | 160 | 150 | 140 | 200 | 210 |
| | | | | | | | | | | | (Kg/cm$^2$) |

TABLE 40

| t/day | 42 | 43 | 44 | 45 | 46 | 47 | 48 | 49 | 50 | 51 | 52 |
|---|---|---|---|---|---|---|---|---|---|---|---|
| 0 | 870 | 870 | 870 | 860 | 870 | 860 | 880 | 870 | 870 | 870 | 880 |
| 3 | 680 | 690 | 670 | 680 | 690 | 700 | 680 | 650 | 640 | 650 | 650 |
| 7 | 600 | 590 | 580 | 570 | 580 | 590 | 580 | 600 | 590 | 580 | 590 |
| 10 | 510 | 510 | 500 | 480 | 500 | 500 | 490 | 520 | 520 | 510 | 540 |
| 15 | 210 | 190 | 200 | 210 | 200 | 210 | 200 | 160 | 170 | 160 | 160 |
| | | | | | | | | | | | (Kg/cm$^2$) |

TABLE 41

| t/day | 53 | 54 | 55 | 56 | 57 | 58 | 59 | 60 | 61 | 62 | 63 |
|---|---|---|---|---|---|---|---|---|---|---|---|
| 0 | 870 | 880 | 890 | 880 | 890 | 870 | 870 | 870 | 870 | 860 | 870 |
| 3 | 640 | 650 | 670 | 650 | 650 | 670 | 680 | 690 | 670 | 680 | 690 |
| 7 | 590 | 580 | 590 | 600 | 590 | 580 | 600 | 590 | 580 | 570 | 580 |
| 16 | 520 | 510 | 520 | 520 | 540 | 500 | 510 | 510 | 500 | 480 | 500 |
| 15 | 170 | 160 | 150 | 160 | 170 | 200 | 210 | 190 | 200 | 210 | 200 |
| | | | | | | | | | | | (Kg/cm$^2$) |

TABLE 42

| t/day | 64 | 65 | 66 | 67 | 68 | 69 | 70 | 71 | 72 | 73 | 74 |
|---|---|---|---|---|---|---|---|---|---|---|---|
| 0 | 860 | 860 | 890 | 870 | 860 | 890 | 890 | 880 | 890 | 890 | 890 |
| 3 | 700 | 680 | 650 | 670 | 680 | 650 | 650 | 650 | 670 | 650 | 650 |
| 7 | 590 | 570 | 590 | 600 | 580 | 590 | 590 | 580 | 590 | 590 | 590 |
| 10 | 500 | 480 | 540 | 490 | 500 | 540 | 540 | 510 | 520 | 540 | 540 |

TABLE 42-continued

| t/day | 64 | 65 | 66 | 67 | 68 | 69 | 70 | 71 | 72 | 73 | 74 |
|---|---|---|---|---|---|---|---|---|---|---|---|
| 15 | 210 | 210 | 170 | 170 | 180 | 170 | 170 | 160 | 150 | 180 | 170 |

(Kg/cm$^2$)

TABLE 43

| t/day | 75 | 76 | 77 | 78 | 79 | 80 | 81 | 82 | 83 | 84 | 85 |
|---|---|---|---|---|---|---|---|---|---|---|---|
| 0 | 860 | 860 | 890 | 870 | 860 | 890 | 880 | 890 | 870 | 860 | 890 |
| 3 | 680 | 680 | 650 | 670 | 680 | 650 | 650 | 650 | 670 | 680 | 650 |
| 7 | 580 | 570 | 590 | 600 | 580 | 590 | 580 | 590 | 600 | 580 | 590 |
| 10 | 500 | 480 | 540 | 490 | 500 | 540 | 510 | 540 | 490 | 500 | 540 |
| 15 | 180 | 210 | 170 | 170 | 180 | 170 | 160 | 170 | 170 | 180 | 170 |

(Kg/cm$^2$)

TABLE 44

| t/day | 86 | 87 | 88 | 89 | 90 | 91 | 92 |
|---|---|---|---|---|---|---|---|
| 0 | 860 | 890 | 890 | 870 | 860 | 890 | 890 |
| 3 | 680 | 650 | 650 | 670 | 680 | 650 | 650 |
| 7 | 570 | 590 | 590 | 600 | 580 | 590 | 590 |
| 10 | 480 | 540 | 540 | 490 | 500 | 540 | 540 |
| 15 | 210 | 170 | 170 | 170 | 180 | 170 | 170 |

(Kg/cm$^2$)

To a polybutylene terephthalate [PBT] elastomer manufactured by DAINIPPON INK & CHEMICALS, INC. (Product No. GRILUX [registered trademark] EH-700) was added 0.5% by weight of the present hydrolysis stabilizer for an ester group-containing resin comprising as the main component one of the carbodiimides obtained in Synthesis Examples 31 to 92 and the resulting mixture was melt-mixed and extruded using a twin screw extruder and then formed into a film of about 500 μm using a T-die, after which the film thus obtained was injection molded to obtain JIS-K6301 Dumbbell No. 4. The sample thus obtained was immersed in hot water at 95° C. and the tensile strength was measured by a tensile tester every time shown in Tables 45 to 50. The results are shown in Tables 45 to 50.

TABLE 45

| t/day | 31 | 32 | 33 | 34 | 35 | 36 | 37 | 38 | 39 | 40 | 41 |
|---|---|---|---|---|---|---|---|---|---|---|---|
| 0 | 350 | 350 | 350 | 350 | 350 | 350 | 350 | 350 | 350 | 350 | 350 |
| 5 | 340 | 340 | 350 | 340 | 350 | 340 | 340 | 340 | 340 | 350 | 350 |
| 10 | 330 | 340 | 340 | 340 | 340 | 330 | 330 | 330 | 330 | 340 | 340 |
| 20 | 320 | 330 | 320 | 330 | 320 | 320 | 320 | 320 | 320 | 340 | 340 |
| 30 | 310 | 320 | 310 | 320 | 310 | 310 | 310 | 310 | 310 | 330 | 330 |

(Kg/cm$^2$)

TABLE 46

| t/day | 42 | 43 | 44 | 45 | 46 | 47 | 48 | 49 | 50 | 51 | 52 |
|---|---|---|---|---|---|---|---|---|---|---|---|
| 0 | 350 | 350 | 350 | 350 | 350 | 350 | 350 | 350 | 350 | 350 | 350 |
| 5 | 350 | 340 | 350 | 340 | 340 | 340 | 340 | 350 | 350 | 350 | 350 |

TABLE 46-continued

| t/day | 42 | 43 | 44 | 45 | 46 | 47 | 48 | 49 | 50 | 51 | 52 |
|---|---|---|---|---|---|---|---|---|---|---|---|
| 10 | 340 | 330 | 340 | 330 | 340 | 340 | 330 | 340 | 340 | 340 | 340 |
| 20 | 330 | 320 | 330 | 320 | 330 | 340 | 320 | 330 | 330 | 330 | 330 |
| 30 | 330 | 310 | 330 | 320 | 320 | 330 | 310 | 320 | 320 | 320 | 320 |

(Kg/cm²)

TABLE 47

| t/day | 53 | 54 | 55 | 56 | 57 | 58 | 59 | 60 | 61 | 62 | 63 |
|---|---|---|---|---|---|---|---|---|---|---|---|
| 0 | 350 | 350 | 350 | 350 | 350 | 350 | 350 | 350 | 350 | 350 | 350 |
| 5 | 340 | 350 | 340 | 350 | 340 | 340 | 340 | 340 | 350 | 350 | 350 |
| 10 | 330 | 340 | 330 | 340 | 340 | 330 | 330 | 330 | 340 | 340 | 340 |
| 20 | 320 | 330 | 320 | 330 | 330 | 320 | 330 | 320 | 330 | 330 | 330 |
| 30 | 310 | 320 | 310 | 320 | 320 | 310 | 310 | 310 | 320 | 320 | 320 |

(Kg/cm²)

TABLE 48

| t/day | 64 | 65 | 66 | 67 | 68 | 69 | 70 | 71 | 72 | 73 | 74 |
|---|---|---|---|---|---|---|---|---|---|---|---|
| 0 | 350 | 350 | 350 | 350 | 350 | 350 | 350 | 350 | 350 | 350 | 350 |
| 5 | 340 | 340 | 340 | 340 | 340 | 340 | 340 | 340 | 340 | 340 | 340 |
| 10 | 330 | 340 | 340 | 340 | 330 | 330 | 330 | 340 | 340 | 340 | 340 |
| 20 | 320 | 330 | 340 | 330 | 330 | 320 | 320 | 330 | 330 | 330 | 330 |
| 30 | 320 | 320 | 330 | 330 | 310 | 310 | 300 | 310 | 320 | 310 | 320 |

(Kg/cm²)

TABLE 49

| t/day | 75 | 76 | 77 | 78 | 79 | 80 | 81 | 82 | 83 | 84 | 85 |
|---|---|---|---|---|---|---|---|---|---|---|---|
| 0 | 350 | 350 | 350 | 350 | 350 | 350 | 350 | 350 | 350 | 350 | 350 |
| 5 | 340 | 340 | 350 | 340 | 340 | 340 | 340 | 350 | 350 | 340 | 340 |
| 10 | 330 | 330 | 340 | 340 | 330 | 330 | 330 | 340 | 340 | 340 | 330 |
| 20 | 330 | 320 | 330 | 330 | 320 | 330 | 320 | 330 | 330 | 330 | 320 |
| 30 | 320 | 310 | 320 | 320 | 310 | 310 | 310 | 320 | 320 | 320 | 310 |

(Kg/cm²)

TABLE 50

| t/day | 86 | 87 | 88 | 89 | 90 | 91 | 92 |
|---|---|---|---|---|---|---|---|
| 0 | 350 | 350 | 350 | 350 | 350 | 350 | 350 |
| 5 | 340 | 350 | 340 | 340 | 340 | 340 | 350 |
| 10 | 330 | 340 | 340 | 330 | 330 | 330 | 340 |
| 20 | 320 | 330 | 330 | 320 | 330 | 320 | 330 |
| 30 | 310 | 320 | 320 | 310 | 310 | 310 | 320 |

(Kg/cm²)

EXAMPLE 8

A polyethylene terephthalate [PET] resin manufactured by KANEBO LTD. (Product No. EFG-7) and 0.5% by weight of the present hydrolysis stabilizer for an ester group-containing resin comprising as the main component one of the carbodiimides obtained in Synthesis Examples 31 to 92 were melt-mixed and extruded using a twin screw extruder and then formed into a film of about 500 μm using a T-die, after which the film thus obtained was injection molded to obtain JIS-K6301 Dumbbell No. 4. The sample thus obtained was immersed in hot water at 95° C. and the tensile strength was measured by a tensile tester every time shown in Tables 51 to 56. The results are shown in Tables 51 to 56.

TABLE 51

| t/day | 31 | 32 | 33 | 34 | 35 | 36 | 37 | 38 | 39 | 40 | 41 |
|---|---|---|---|---|---|---|---|---|---|---|---|
| 0 | 630 | 630 | 630 | 630 | 630 | 630 | 630 | 630 | 630 | 630 | 630 |
| 10 | 650 | 640 | 650 | 650 | 640 | 650 | 650 | 650 | 640 | 640 | 650 |

TABLE 51-continued

| t/day | 31 | 32 | 33 | 34 | 35 | 36 | 37 | 38 | 39 | 40 | 41 |
|---|---|---|---|---|---|---|---|---|---|---|---|
| 30 | 650 | 650 | 640 | 650 | 650 | 650 | 640 | 640 | 640 | 650 | 650 |
| 60 | 620 | 620 | 640 | 620 | 620 | 630 | 640 | 630 | 630 | 640 | 640 |
| | | | | | | (Kg/cm$^2$) | | | | | |

TABLE 52

| t/day | 42 | 43 | 44 | 45 | 46 | 47 | 48 | 49 | 50 | 51 | 52 |
|---|---|---|---|---|---|---|---|---|---|---|---|
| 0 | 630 | 630 | 630 | 630 | 630 | 630 | 630 | 630 | 630 | 630 | 630 |
| 10 | 650 | 650 | 640 | 650 | 650 | 650 | 650 | 650 | 640 | 650 | 650 |
| 30 | 640 | 650 | 650 | 650 | 640 | 650 | 650 | 650 | 640 | 640 | 650 |
| 60 | 630 | 630 | 640 | 640 | 630 | 640 | 630 | 640 | 620 | 610 | 610 |
| | | | | | | (Kg/cm$^2$) | | | | | |

TABLE 53

| t/day | 53 | 54 | 55 | 56 | 57 | 58 | 59 | 60 | 61 | 62 | 63 |
|---|---|---|---|---|---|---|---|---|---|---|---|
| 0 | 630 | 630 | 630 | 630 | 630 | 630 | 630 | 630 | 630 | 630 | 630 |
| 10 | 640 | 640 | 650 | 650 | 650 | 650 | 640 | 650 | 650 | 650 | 650 |
| 30 | 650 | 640 | 650 | 650 | 650 | 640 | 650 | 650 | 650 | 640 | 640 |
| 60 | 630 | 620 | 620 | 630 | 620 | 610 | 610 | 620 | 610 | 610 | 610 |
| | | | | | | (Kg/cm$^2$) | | | | | |

TABLE 54

| t/day | 64 | 65 | 66 | 67 | 68 | 69 | 70 | 71 | 72 | 73 | 74 |
|---|---|---|---|---|---|---|---|---|---|---|---|
| 0 | 630 | 630 | 630 | 630 | 630 | 630 | 630 | 630 | 630 | 630 | 630 |
| 10 | 640 | 640 | 640 | 650 | 650 | 640 | 650 | 650 | 650 | 650 | 650 |
| 30 | 640 | 650 | 650 | 650 | 650 | 640 | 650 | 650 | 650 | 650 | 650 |
| 60 | 640 | 630 | 640 | 610 | 610 | 600 | 610 | 610 | 630 | 610 | 620 |
| | | | | | | (Kg/cm$^2$) | | | | | |

TABLE 55

| t/day | 75 | 76 | 77 | 78 | 79 | 80 | 81 | 82 | 83 | 84 | 85 |
|---|---|---|---|---|---|---|---|---|---|---|---|
| 0 | 630 | 630 | 630 | 630 | 630 | 630 | 630 | 630 | 630 | 630 | 630 |
| 10 | 650 | 640 | 640 | 650 | 650 | 640 | 650 | 650 | 650 | 640 | 650 |
| 30 | 640 | 650 | 650 | 650 | 650 | 640 | 650 | 650 | 650 | 640 | 650 |
| 60 | 610 | 630 | 640 | 610 | 610 | 600 | 610 | 610 | 610 | 600 | 610 |
| | | | | | | (Kg/cm$^2$) | | | | | |

TABLE 56

| t/day | 86 | 87 | 88 | 89 | 90 | 91 | 92 |
|---|---|---|---|---|---|---|---|
| 0 | 630 | 630 | 630 | 630 | 630 | 630 | 630 |
| 10 | 640 | 650 | 650 | 640 | 650 | 650 | 650 |
| 30 | 650 | 650 | 650 | 640 | 650 | 650 | 650 |
| 60 | 640 | 610 | 610 | 600 | 610 | 610 | 610 |
| | | | | (Kg/cm$^2$) | | | |

As described above, the present hydrolysis stabilizer for an ester-containing resin has an excellent compatibility with the ester group-containing resin and can be added to the resin without causing any trouble when the resin was synthesized and melt-kneaded. Moreover, since the hydrolysis stabilizer has a high molecular weight, it can sufficiently exhibit the hydrolysis stabilizing effect on the resin.

The present process for the hydrolysis stabilization of an ester group-containing resin comprises mixing the above-mentioned hydrolysis stabilizer with the ester group-containing resin, and hence, can be easily carried out.

What is claimed is:

1. A process for the hydrolysis stabilization of an ester group-containing resin, which comprises mixing the ester group-containing resin with a carbodiimide having at least two carbodiimide groups in the molecule and produced by carboniimidization of 4,4'-dicyclohexylmethane diisocyanate represented by the formula (I):

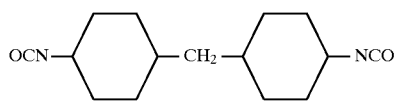 (I)

or isophorone diisocyanate represented by the formula (II):

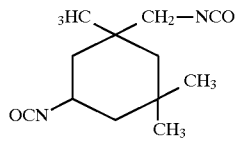 (II)

or a mixture of 4,4'-dicyclohexylmethane diisocyanate of the formula (I) and isophorone diisocyanate of the formula (II).

2. A process for the hydrolysis stabilization of an ester group-containing resin according to claim 1, wherein the carbodiimide is end-blocked with a primary or secondary amine, a carboxylic acid, an acid anhydride or a monoisocyanate.

3. A process for the hydrolysis stabilization of an ester group-containing resin according to claim 1, wherein the carbodiimide has an average degree of polymerization of 2 to 30.

4. A process for the hydrolysis stabilization of an ester group-containing resin, which comprises mixing the ester group-containing resin with a carbodiimide having at least two carbodiimide groups in the molecule and produced by the carbodiimidization a mixture of tetramethylxylylene diisocyanate represented by the formula (III):

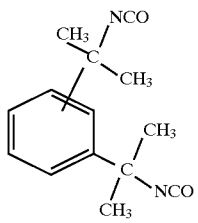 (III)

with 4,4'-dicyclohexylmethane diisocyanate represented by the formula (I):

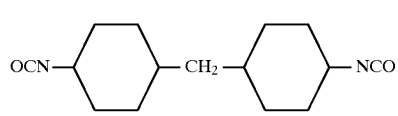 (I)

or isophorone diisocyanate represented by the formula (II):

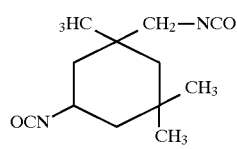 (II)

or a mixture of 4,4'-dicyclohexylmethane diisocyanate of the formula (I) and isophorone diisocyanate of the formula (II).

5. A process for the hydrolysis stabilization of an ester group-containing resin according to claim 4, wherein the carbodiimide is end-blocked with a primary or secondary amine, a carboxylic acid, an acid anhydride or a monoisocyanate.

6. A process for the hydrolysis stabilization of an ester group-containing resin according to claim 4, wherein the carbodiimide has an average degree of polymerization of 2 to 30.

* * * * *